(12) United States Patent
Allen et al.

(10) Patent No.: US 8,505,030 B2
(45) Date of Patent: Aug. 6, 2013

(54) COORDINATING RESOURCES USING A VOLATILE NETWORK INTERMEDIARY

(75) Inventors: Nicholas A. Allen, Redmond, WA (US); Affan Arshad Dar, Woodinville, WA (US); John A. Taylor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 12/018,401

(22) Filed: Jan. 23, 2008

(65) Prior Publication Data

US 2009/0133036 A1    May 21, 2009

Related U.S. Application Data

(60) Provisional application No. 60/988,737, filed on Nov. 16, 2007, provisional application No. 60/988,736, filed on Nov. 16, 2007.

(51) Int. Cl.
*G06F 9/46* (2006.01)
*G06F 7/00* (2006.01)

(52) U.S. Cl.
USPC .......................... 719/313; 707/610; 718/104

(58) Field of Classification Search
None
See application file for complete search history.

(56) References Cited

U.S. PATENT DOCUMENTS

| | | | |
|---|---|---|---|
| 5,339,392 A | 8/1994 | Risberg | |
| 5,371,889 A | 12/1994 | Klein | |
| 5,452,445 A | 9/1995 | Hallmark et al. | |
| 5,465,328 A * | 11/1995 | Dievendorff et al. | 714/15 |
| 5,592,622 A | 1/1997 | Isfeld | |
| 5,802,310 A | 9/1998 | Rajaraman | |
| 5,913,213 A * | 6/1999 | Wikstrom et al. | 707/610 |
| 5,924,097 A | 7/1999 | Hill et al. | |
| 5,974,442 A | 10/1999 | Adams | |
| 6,185,197 B1 | 2/2001 | Cheung | |
| 6,263,360 B1 | 7/2001 | Arnold | |
| 6,332,150 B1 | 12/2001 | Khan et al. | |
| 6,353,834 B1 | 3/2002 | Wong | |
| 6,425,017 B1 | 7/2002 | Dievendorff et al. | |

(Continued)

FOREIGN PATENT DOCUMENTS

| | | |
|---|---|---|
| EP | 1198106 | 4/2002 |
| EP | 1873643 A1 | 1/2008 |
| WO | WO2006118529 A2 | 11/2006 |

OTHER PUBLICATIONS

Ceponiene, Lina, et al., "Transformation from Requirements to Design for Service Oriented Information Systems", ADBIS Research Communications, 2005, pp. 164-177.

(Continued)

*Primary Examiner* — Charles E Anya
(74) *Attorney, Agent, or Firm* — Workman Nydegger

(57) ABSTRACT

The present invention extends to methods, systems, and computer program products for coordinating resources using a volatile network intermediary. Embodiments provide a mechanism for an network intermediary to facilitate a state coordination pattern between an application and a communication medium when the communication medium does not support the state coordination pattern. In some embodiments, receiving applications can make use of this network intermediary by changing the receive location. However, the receiving application may not be able to distinguish the network intermediary from a native implementation of the state coordination pattern. Further, the network intermediary does not require deployment of a persistent or durable store to coordinate state between receiving applications and the original communication medium.

20 Claims, 4 Drawing Sheets

(56) References Cited

U.S. PATENT DOCUMENTS

| | | | |
|---|---|---|---|
| 6,463,480 B2* | 10/2002 | Kikuchi et al. | 719/315 |
| 6,484,196 B1 | 11/2002 | Maurille | |
| 6,609,178 B1 | 8/2003 | Ofer | |
| 6,687,735 B1 | 2/2004 | Logston et al. | |
| 6,748,583 B2 | 6/2004 | Aizenbud-Reshef et al. | |
| 6,817,018 B1 | 11/2004 | Clarke et al. | |
| 6,845,230 B2 | 1/2005 | Syed | |
| 6,848,108 B1 | 1/2005 | Caron | |
| 6,848,109 B1 | 1/2005 | Kühn | |
| 6,853,617 B2 | 2/2005 | Watson et al. | |
| 6,886,041 B2 | 4/2005 | Messinger | |
| 6,886,169 B2 | 4/2005 | Wei | |
| 6,968,395 B1 | 11/2005 | Lee | |
| 6,971,001 B1 | 11/2005 | Rolfs | |
| 6,983,322 B1 | 1/2006 | Tripp et al. | |
| 7,068,634 B2 | 6/2006 | Vanttinen | |
| 7,111,001 B2* | 9/2006 | Harris et al. | 1/1 |
| 7,149,976 B2 | 12/2006 | Yagati | |
| 7,154,901 B2 | 12/2006 | Chava et al. | |
| 7,200,676 B2 | 4/2007 | Christensen et al. | |
| 7,240,350 B1 | 7/2007 | Eberhard | |
| 7,318,109 B2 | 1/2008 | Liscano et al. | |
| 7,330,860 B2* | 2/2008 | Adiba et al. | 1/1 |
| 7,370,329 B2 | 5/2008 | Kumar | |
| 7,380,135 B2 | 5/2008 | Nishimoto et al. | |
| 7,392,057 B2 | 6/2008 | Lee | |
| 7,409,428 B1 | 8/2008 | Brabec | |
| 7,434,225 B2 | 10/2008 | Groetzner et al. | |
| 7,527,558 B2 | 5/2009 | Lavoie | |
| 7,543,181 B2* | 6/2009 | Buxton et al. | 714/15 |
| 7,565,451 B2 | 7/2009 | Cabrera | |
| 7,631,108 B2* | 12/2009 | Kesselman et al. | 709/250 |
| 7,640,249 B2 | 12/2009 | Smits | |
| 7,711,788 B2 | 5/2010 | Lev Ran et al. | |
| 7,743,109 B2 | 6/2010 | Kaminsky et al. | |
| 7,783,610 B2 | 8/2010 | Lin et al. | |
| 7,802,263 B2 | 9/2010 | Fuchs | |
| 7,865,684 B2 | 1/2011 | Michaylov | |
| 7,937,364 B1 | 5/2011 | Chandrasekaran | |
| 7,945,631 B2 | 5/2011 | Chkodrov et al. | |
| 8,095,935 B2 | 1/2012 | Paramasivam et al. | |
| 8,301,706 B2 | 10/2012 | Paramasivam et al. | |
| 2001/0023482 A1 | 9/2001 | Wray | |
| 2002/0116538 A1* | 8/2002 | Chen et al. | 709/314 |
| 2004/0162901 A1 | 8/2004 | Mangipudi et al. | |
| 2004/0186918 A1 | 9/2004 | Lonnfors | |
| 2004/0268357 A1 | 12/2004 | Joy et al. | |
| 2005/0147057 A1 | 7/2005 | LaDue | |
| 2005/0195820 A1 | 9/2005 | Betts | |
| 2005/0219617 A1 | 10/2005 | Mochizuki | |
| 2005/0278270 A1 | 12/2005 | Carr | |
| 2006/0053163 A1 | 3/2006 | Liu et al. | |
| 2006/0080579 A1 | 4/2006 | Rothman et al. | |
| 2006/0085797 A1* | 4/2006 | Connelly | 719/314 |
| 2006/0101064 A1 | 5/2006 | Strong | |
| 2006/0136367 A1 | 6/2006 | Todd | |
| 2006/0146879 A1 | 7/2006 | Anthias et al. | |
| 2006/0149865 A1 | 7/2006 | Kirstein | |
| 2006/0155862 A1 | 7/2006 | Kathi et al. | |
| 2006/0187902 A1 | 8/2006 | Birch et al. | |
| 2006/0230062 A1 | 10/2006 | Roy-Chowdhury et al. | |
| 2007/0005640 A1 | 1/2007 | Klein | |
| 2007/0027928 A1* | 2/2007 | Majumdar | 707/200 |
| 2007/0109592 A1 | 5/2007 | Parvathaneni et al. | |
| 2008/0086567 A1 | 4/2008 | Langen et al. | |
| 2008/0288954 A1 | 11/2008 | Fuchs | |
| 2009/0132671 A1 | 5/2009 | Chkodrov et al. | |
| 2009/0133037 A1 | 5/2009 | Allen | |
| 2009/0199208 A1 | 8/2009 | Pinto | |
| 2009/0216793 A1 | 8/2009 | Szyperski | |
| 2009/0222794 A1 | 9/2009 | Pinto | |
| 2009/0282396 A1 | 11/2009 | Boyer | |
| 2009/0319911 A1 | 12/2009 | McCann et al. | |
| 2009/0320044 A1 | 12/2009 | Dar et al. | |

OTHER PUBLICATIONS

Arbab, Farhad, "The Influence of Coordination on Program Structure", 1997 IEEE, pp. 300-309.

Zambonelli, Franco, et al., "Programmable Coordination Infrastructures for Mobility", 2001, 5 pages.

Arbab, Farhad, et al., "Coordination through Channel Composition", 2002, LNCS 2315, pp. 22-39.

Castro, Eva M., et al., Departamento de Ingenieria de Sistemas Telematicos Universidad Politecnica de Madrid DIT.UPM, "Reliable Multicast for Coordination of Cooperative Applications", http://jungla.dit.upm.es/~ecastro/ReliableMulticast/rmulticast.html, 1999, 1 page.

Guermouche, Abdou, et al., "A study of various load information exchange mechanisms for a distributed application using dynamic scheduling" Jan. 2005, 16 pages.

Albrecht, Jeannie, et al., "Remote Control: Distributed Application Configuration, Management, and Visualization with Plush", 2007, 16 pages.

U.S. Appl. No. 12/019,041, filed Jan. 24, 2008, Nicholas A. Allen.

Aaron Skonnard, Pluralsight, "A Developer's Introduction to Windows Communication Foundation (WCF).NET 4 Beta 1", Jul. 2009, 57 pages.

U.S. Appl. No. 12/767,091, filed Apr. 26, 2010, Allen.

U.S. Appl. No. 12/727,066, filed Mar. 18, 2010, Allen.

Bhatti, Nina T., et al., "A System for Constructing Configurable High-Level Protocols", 1995, 13 pages.

Lee, Whay Sing, et al., "An Efficient, Protected Message Interface", Nov. 1998, pp. 69-75.

Nodine, Marian, et al., "Task Coordination Paradigms for Information Agents", Lecture Notes in Computer Science; vol. 1986, Proceedings of the 7th International Workshop on Intelligent Agents VII. Agent Theories Architectures and Languages, Year of Publication: 2000, 15 pages.

Onion, Fritz, "State Management in ASP.NET", informIT, May 30, 2003, 5 pages.

Allen, Nicholas, "Nicholas Allen's Indigo Blog—Future of Queuing", Windows Communication Foundation from the Inside, Dec. 1, 2008, 2 pages.

Notice of Allowance dated Jan. 18, 2012 cited in U.S. Appl. No. 12/767,091.

Office Action dated Mar. 12, 2012 cited in U.S. Appl. No. 12/019,041.

Office Action dated Oct. 5, 2011 cited in U.S. Appl. No. 12/019,041.

Office Action dated Jun. 27, 2012 cited in U.S. Appl. No. 12/727,066.

U.S. Appl. No. 13/432,341, filed Mar. 28, 2012, Allen.

U.S. Appl. No. 12/767,091, mail date Jun. 25, 2012, Notice of Allowance.

Office Action dated Oct. 17, 2012 cited in U.S. Appl. No. 12/605,236.

Notice of Allowance mailed Nov. 2, 2012 cited in U.S. Appl. No. 12/727,066.

Load-Balancing for MySQL http://diku.dk/publikationer/tekniske.rapporter/rapporter/03-1.pdf (67 pages) Fall 2003—Dennis haney & Klaus S. Madsen.

Planning for Reliability and High Availability http://msdn.microsoft.com/en-us/library/ms942932.aspx (32 pages) 2008—Microsoft Coorporation. [Retrieved from the internet May 21, 2008].

Distributed Computing with BEA WebLogic Server http://www-db.cs.wisc.edu/cidr/cidr2003/program/p26.pdf (11 pages) Jan. 5-8, 2003—Dean Jacobs—BEA Systems.

U.S. Appl. No. 13/655,162, filed Oct. 18, 2012, Paramasivam.

On Affinity Based Routing in Multi-System Data Sharing http://www.vidb.org/conf/1986/P249.PDF (8 pages) Aug. 1986—Phillip S. Yu, Douglas W. Cornell, Daniel M. Dias and Balakrishna R Iyler.

U.S. Appl. No. 12/484,741, Jun. 27, 2012, Notice of Allowance.

Notice of Allowance mailed Jan. 4, 2013 cited in U.S. Appl. No. 12/727,066.

Office Action dated Oct. 3, 2012 cited in U.S. Appl. No. 12/019,041.

Office Action dated Mar. 28, 2013, U.S. Appl. No. 12/605,236.

Office Action dated Apr. 4, 2013, U.S. Appl. No. 12/019,041.

Office Action dated Apr. 12, 2013, U.S. Appl. No. 13/655,162.

Notice of Allowance dated May 20, 2013, U.S. Appl. No. 12/727,066.

\* cited by examiner

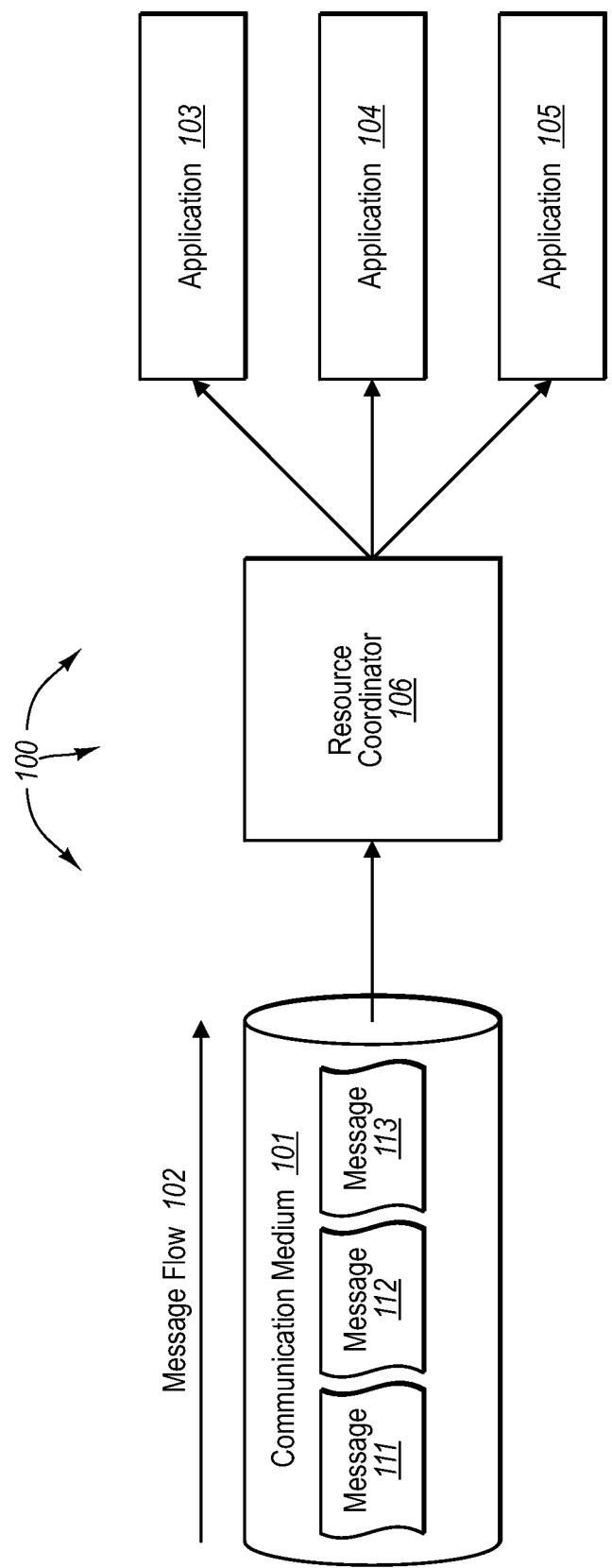

ional Application No. 60/988,737, entitled "Using A Volatile Network Intermediary To Coordinate Resources", filed on Nov. 16, 2007, which is incorporated herein in its entirety. This application claims the benefit of U.S. Provisional Application No. 60/988,736, entitled "Coordinating Application State and Communication Medium State", filed on Nov. 16, 2007, which is incorporated herein in its entirety

COORDINATING RESOURCES USING A VOLATILE NETWORK INTERMEDIARY

CROSS-REFERENCE TO RELATED APPLICATIONS

This application claims the benefit of U.S. Provisional Application No. 60/988,737, entitled "Using A Volatile Network Intermediary To Coordinate Resources", filed on Nov. 16, 2007, which is incorporated herein in its entirety. This application claims the benefit of U.S. Provisional Application No. 60/988,736, entitled "Coordinating Application State and Communication Medium State", filed on Nov. 16, 2007, which is incorporated herein in its entirety

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs.

In general, distributed application programs comprise components that are executed over several different hardware components. Distributed application programs are often large, complex, and diverse in their implementations. One can appreciate, that while this ability to combine processing power through several different computer systems can be an advantage, there are various complexities associated with distributing application program modules.

For example, applications can change internal state in accordance with the contents of messages received over a communication medium. In addition to application state change, the communication medium can also change state (e.g., in that it no longer contains the message). Generally, the process of receiving a message involves at least two steps: a) an application accesses message content and b) the state of the communication medium is updated. When these two steps are combined into a single receive function, coordinating the respective state changes in the application and the communication medium can be difficult.

For example, the delivery of a message alters the state of the communication medium in that the message is no longer present in the communication medium following delivery. The receipt of a message also alters the state of an application determined by the particular custom logic of that application. The custom logic may require access to the contents of the message being delivered. Thus, processing difficulties (e.g., duplicate and inappropriate processing by competing application consumers) can occur when access to the contents of a message is coupled to the state change in the communication medium.

In some environments, the difficulties are partially addressed by allowing the application to execute the receive function on the communication medium and its own internal state change under the same two-phase commit transaction. However, under such circumstance the application is unable to use two-phase commit transactions as part of the process of deciding on its final state. This would happen, for example, if an application was executing multiple processing attempts to arrive at the final state.

BRIEF SUMMARY

The present invention extends to methods, systems, and computer program products for coordinating resources using a volatile network intermediary. A communication medium receives one or more messages. An application requests a message from the communication medium for processing. The intermediary resource manager receives the request for a message from the application. When appropriate, the intermediary resource manager enumerates the one or more messages of the communication medium to identify an available message.

The intermediary resource manager implements at least part of a state coordination pattern to facilitate processing of the available message. The intermediary resource manager implements the state coordination pattern on behalf of the communication medium to coordinate state between the application and the communication medium. In some embodiments, to implement at least part of the state coordination pattern, the intermediary resource manager accesses the contents of the available message. The intermediary resource manager locks the message to prevent further access to the contents of the message. The intermediary resource manager then provides the accessed contents to the application.

The application receives the contents of the message. The application attempts to update application state based on the contents of the message. The application signals the results of the attempted application state update (e.g., indicating successful processing of the available message) to the communication medium. The intermediary resource manager receives the signal from the application indicating the results of the attempt to update application state based on the contents of the message. The intermediary resource manager determines what the corresponding communication medium state is to be based on and in response to the received signal indicating the results of attempting to update the application state.

The intermediary resource manager implements at least a second part of the state coordination pattern on behalf of the communication medium to coordinate the corresponding communication medium state with the application state. In some embodiments, to implement at least a second part of the state coordination pattern, the intermediary resource manager unlocks the message in response to the signal.

When appropriate, the intermediary resource manager signals a corresponding appropriate state update to the communication medium (e.g., to delete the message). The communication medium receives the state update from the intermediary resource manager. The communication medium updates the communication medium state in accordance with and in response to the state update signal. The communication medium update causes the communication medium state to correspond to the application state.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates an example computer architecture that facilitates using a volatile network intermediary to coordinate resources.

DETAILED DESCRIPTION

Figure 1B:
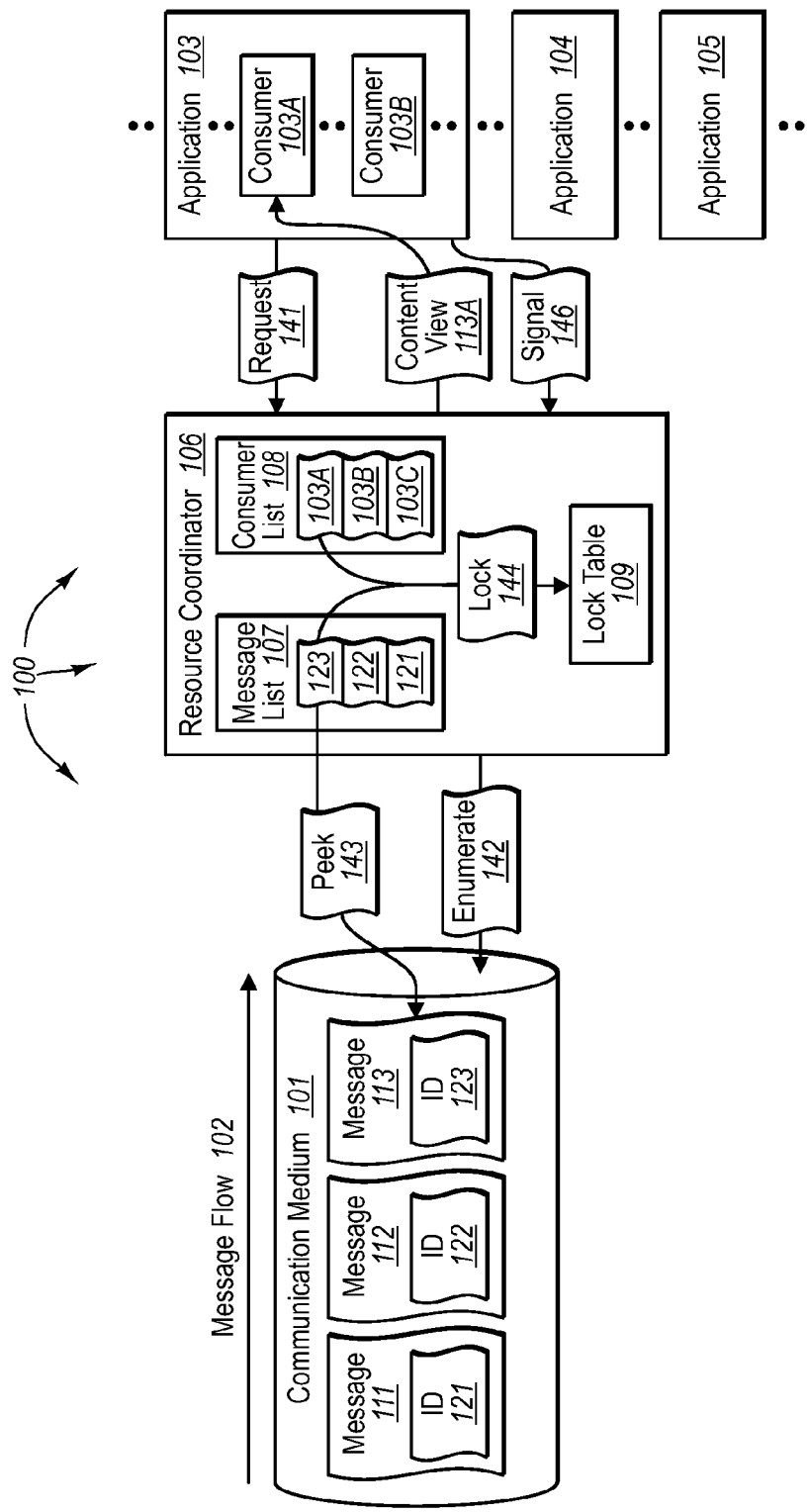
FIG. 1B illustrates an example computer architecture of FIG. 1A with an expanded view of an intermediary resource coordinator.

The present invention extends to methods, systems, and computer program products for using a volatile network intermediary to coordinate resources. A communication medium receives one or more messages. An application requests a message from the communication medium for processing. The intermediary resource manager receives the request for a message from the application. When appropriate, the intermediary resource manager enumerates the one or more messages of the communication medium to identify an available message.

The intermediary resource manager implements at least part of a state coordination pattern to facilitate processing of the available message. The intermediary resource manager implements the state coordination pattern on behalf of the communication medium to coordinate state between the application and the communication medium. In some embodiments, to implement at least part of the state coordination pattern, the intermediary resource manager accesses the contents of the available message. The intermediary resource manager locks the message to prevent further access to the contents of the message. The intermediary resource manager then provides the accessed contents to the application.

The application receives the contents of the message. The application attempts to update application state based on the contents of the message. The application signals the results of the attempted application state update (e.g., indicating successful processing of the available message) to the communication medium. The intermediary resource manager receives the signal from the application indicating the results of the attempt to update application state based on the contents of the message. The intermediary resource manager determines what the corresponding communication medium state is to be based on and in response to the received signal indicating the results of attempting to update the application state.

The intermediary resource manager implements at least a second part of the state coordination pattern on behalf of the communication medium to coordinate the corresponding communication medium state with the application state. In some embodiments, to implement at least a second part of the state coordination pattern, the intermediary resource manager unlocks the message in response to the signal.

When appropriate, the intermediary resource manager signals a corresponding appropriate state update to the communication medium (e.g., to delete the message). The communication medium receives the state update from the intermediary resource manager. The communication medium updates the communication medium state in accordance with and in response to the state update signal. The communication medium update causes the communication medium state to correspond to the application state. However, if the current communication medium state is already appropriate, the intermediary resource manager may not send a state update signal to the communication medium.

Accordingly, a network intermediary, such as, for example, a resource manager, can interface between receiving applications that support a state coordination pattern and a communication medium that does not. The network intermediary provides an implementation of the state coordination pattern for the receiving applications to use and manipulates the state of the communication medium such that the state of the communication medium and the state of the receiving applications are coordinated precisely as if the original communication medium supported the pattern directly. Thus, receiving applications connect through the network intermediary rather than directly to the original communication medium. Receiving applications can have their receive location modified to communicate with the network intermediary. However, the receiving applications have little, if any, difference in behavior, and the original communication medium has little, if any, difference in behavior.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates using a volatile network intermediary to coordinate resources. Referring to FIG. 1, computer architecture 100 includes communication medium 101, message flow 102, applications 103, 104, and 105, and resource coordinator 106. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Communication medium 101 can be virtually any type of medium, such as, for example, a queue system or database, that provides a series of messages to applications. Thus, communication medium 101 can carry message flow 102 having a plurality of messages, including messages 111, 112, and 113. The messages of message flow 102 can be sent from some other network connectable system or device for delivery to any of applications 103, 104, 105 etc. Each message can be identified by a message identifier and can include a packet of data. Communication medium 101 can create message identifiers from a hash of the message contents. Thus communication, medium 101 has state including: the messages 111, 112, and 113, corresponding message identifiers, and a message ordering.

Several receiving applications 103, 104, and 105 are connected to communication medium 101. Each application can include a plurality of competing consumers, which compete for messages being received at the application. For example, consumers of application 103 can be configured to compete for purchase orders from message flow 102.

For any number of reasons, such as, for example, scalability, applications and their consumers for can be physically distributed across a number of nodes. Each consumer can have a copy of application logic for its corresponding application to compete for messages. Thus, there can be several instances of competing application logic for an application running concurrently and competing with each other for messages from communication medium 101.

When an application consumes a message, a state change to both communication medium 101 and the application occurs. Accordingly, applications 103, 104 and 105 can support a state coordination pattern. In some embodiments, applications support a peek lock state coordination pattern that includes: a) the application accessing a view of message contents (i.e., a "peek") and b) locking the message until the application signals how the message is to be handled (e.g., deleted or unlocked)

In some environments, communication medium 101 does not natively support the (e.g., peek lock) state coordination pattern of applications 103, 104, and 105. Accordingly, resource coordinator 106 interfaces with and acts on behalf of communication medium 101 to participate in a state coordination pattern with any of applications 103, 104, and 105.

Thus, resource coordinator 106 can be configured to participate in a peek local coordination pattern that provides applications with a view of message contents (a "peek") and locks messages during the time the application is viewing the contents of the message. Resource coordinator 106 can be configured to permit one competing consumer to access a message at a time. Upon providing access to a message, resource coordinator 106 can lock the message to prevent other consumers from accessing the message.

Resource coordinator 106 appears to applications 103, 104, and 105 as a communication medium. Thus, applications 103, 104, and 105 connect to resource coordinator 106, which in turn manipulates the state of communication medium 101 to implement the peek lock state coordination pattern.

Although, communication medium 101 does not necessarily support the peek lock protocol, communication medium 101 can support some basic messaging operations, such as, for example, retrieving the contents of a message with a particular identifier, deleting a message with a particular identifier, and enumerating the identifiers of the series of messages. Some basic operations, such as, for example, retrieving the contents of a message and enumerating the identifiers do not change the state of the communication medium 101. On the other hand, other basic operations, such as, for example, deleting a message, do change the state of the communication medium 101. A delete operation can be coordinated through use of a two-phase transaction. Resource coordinator 106 can build on the supported operations of communication medium, 101 and/or provide additional operations to implement a state coordination pattern, such as, for example, a peek lock state coordination pattern, for communication medium 101.

Referring now to FIG. 1B, FIG. 1B illustrates an example computer architecture 100 with an expanded view of an resource coordinator 106. As depicted, resource coordinator 106 includes message list 107, consumer list 108, and lock table 109. Message list 107 can be a temporary queue that lists corresponding enumerated message IDs (e.g., IDs 123, 122, and 121) as messages (e.g., 113, 112, and 111 respectively) are received from communication medium 101. Consumer list 108 can be a temporary queue that lists competing consumers (e.g., 103A, 103B, 103C, etc.) for messages from communication medium 101. Application 103 includes a plurality of competing consumers, including consumer 103A and 103B, which compete for messages being received at application 103. For example, consumers 103A, 103B, etc. can be configured to process purchase orders included in message flow 102. Thus, consumers 103A, 103B, etc. can be listed in consumer list 108.

Resource coordinator 106 can appear to applications 103, 104, and 105 (and their corresponding consumers) as another communication medium. To configure 103, 104, and 105 to interact with resource coordinator 106 their receive location can be changed (e.g., from communication medium 101 to resource coordinator 106). Thus, a consumer can request a message from resource coordinator 106 or another other communication medium with support for (e.g., a peek lock) state coordination pattern in virtually the same manner.

For example, consumer 103A can request a message from resource coordinator 106 using a peek lock state coordination pattern. In response, resource coordinator 106 can enumerate 142 the messages in communication medium 101 to build a message list 107. Resource coordinator 106 then can enumerate message IDs in message list 107 until it finds a message not present in lock table 109. If no such message exists (i.e., all messages are locked), then the resource coordinator 106 waits until a new message arrives at communication medium 101 or until a previously locked message is unlocked.

When a message is identified, resource coordinator 106 retrieves the contents of the selected message from the communication medium 101. Resource coordinator 106 records the message identifier of the selected message along with an identifier for consumer 103A in lock table 109. Resource coordinator 106 then transmits a view of the message contents to consumer 103A.

When a message is locked, another competing consumer sees the next message in a message flow as the message immediately behind the locked message. Through message list 107, resource coordinator 106 can compute a next available message (or message that isn't already being examined by a consumer) in message flow 102. Thus, when consumer 103A is examining message 113, the next available message ID in the enumeration of message list 107 is message ID 122. Accordingly, consumer 103B sees message 112 as the next message.

If a receiving application chooses not to consume the selected message, then it signals resource coordinator 106 to unlock the message. In response, resource coordinator 106 removes the record (message ID/consumer ID association) from lock table 109. For example, application 103 can transmit an unlock request back to resource coordinator 106 to unlock message 113.

A message associated with a particularly receiving application can also be unlocked if the receiving application disconnects from resource coordinator 106 without transmitting either a delete or unlock request.

On the other hand, if the receiving application chooses to consume the selected message, then it signals resource coordinator 106 to delete the message. In response, resource coordinator 106 deletes the message from the communication medium and removes the record from its lock table. For example, application 103 can transmit a delete request back to resource coordinator 106 to delete message 113 form communication medium 101.

A receiving application can choose to supply a two-phase transaction with the delete request. When present, the transaction atomically coordinates removal of the message from the communication medium, removal of the record from the lock table, and any application operations associated with the transaction. If a transaction aborts the lock on a message remains. The receiving application can then use another transaction for a subsequent attempt to process the delete request. Alternately, the receiving application can unlock message.

In some embodiments, after a resource manager creates a lock for a message, a communication medium and application coordinate transfer of the message without relaying through the resource manager. For example, resource coordinator 106 can create a lock for message 113. Subsequent to lock creation, application 103 and communication medium 101 can coordinate transfer of the contents of message 113 to application 103 without relaying through resource coordinator 106.

Accordingly, application 103 (through consumer 103A) is permitted to examine (or "peek" at) message 113 while resource coordinator 106 maintains an exclusive lock on message 113. After a state transition, application 103 can signal resource coordinator 106 to delete message 113. In response to a delete signal, resource coordinator 106 can delete message 113 from communication medium 101. A delete signal completes the successful receipt of a message. Alternately, application 103 can also signal resource coordinator 106 to release the lock of message 113 if application 103 cannot accept the message 113. An unlock completes an unsuccessful receipt of a message.

Embodiments of the invention can include various optimizations that can be implemented singly or in combination with one another:

Enumeration caching: Resource manger 106 can skip the enumeration process 142 if it already knows the identifier of the next available message in the communication medium 101 by maintaining an updated message list 107.

Event-driven enumeration: Rather than expressly enumerating 142 the message identifiers, resource coordinator 106 can construct message list 107 by receiving updates about changes in the communication medium state by subscribing to events.

Peek ahead: Resource coordinator 106 can retrieve messages from communication medium 101 in advance of a request from a receiving application to reduce the latency of the receive operation.

Peek batching: Resource coordinator 106 and communication medium 101 can coordinate to transmit multiple messages at the same time in a more efficient fashion.

Lock batching: Resource coordinator 106 and receiving applications may coordinate to perform multiple lock requests at the same time in a more efficient fashion.

Lock timeouts: Resource coordinator 106 can unlock a particular message after a timeout period rather than waiting for the receiving application to disconnect to clean up locks faster when the interval of time for noticing a disconnection is large.

Message retention: Resource coordinator 106 can store a copy of a locked message so that it does not have to retrieve the message again if it is unlocked by the receiving application.

Figure 2A:
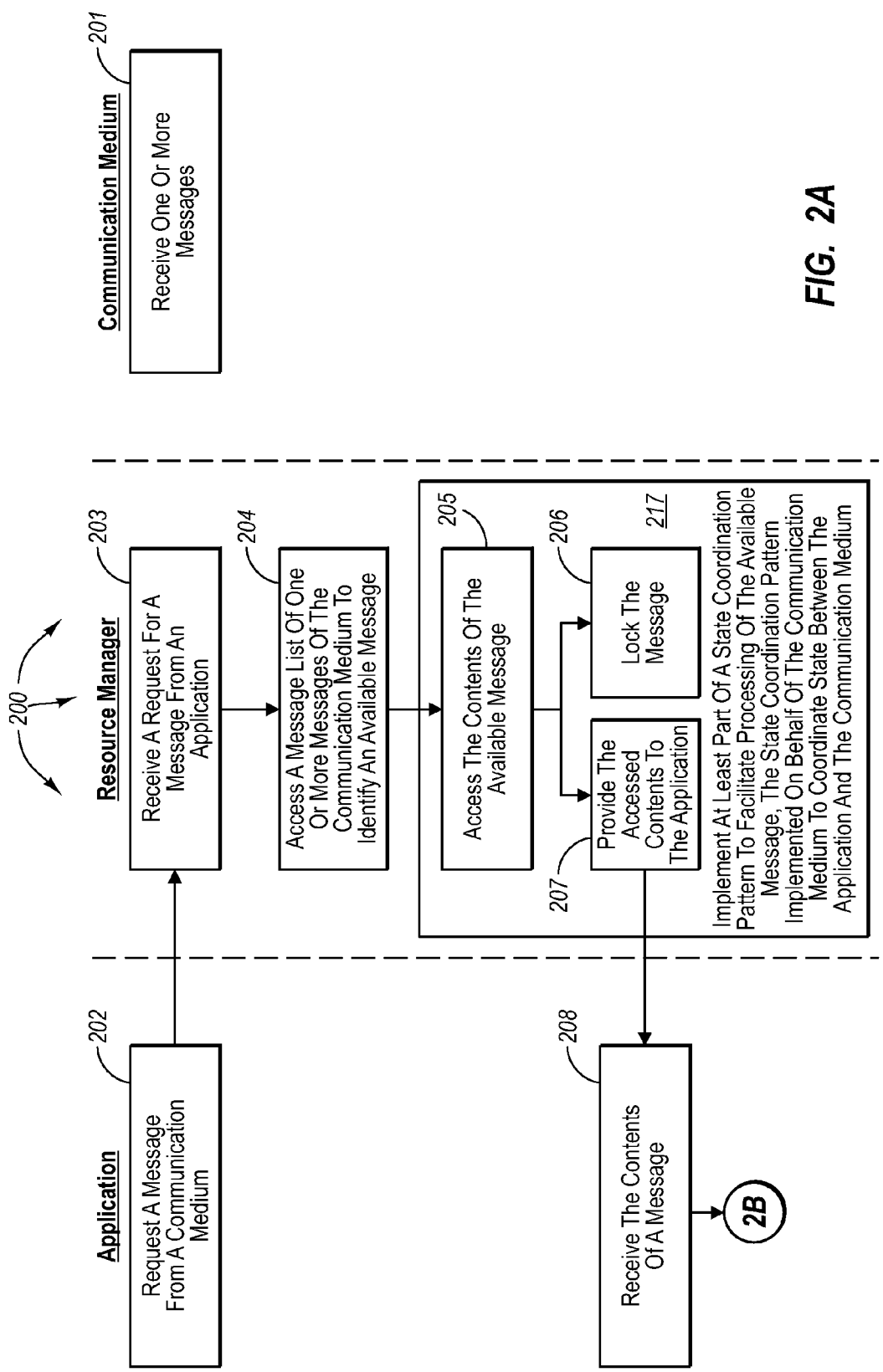
FIGS. 2A and 2B illustrates a flow chart of an example method for using a volatile network intermediary to coordinate resources.
Figure 2B:
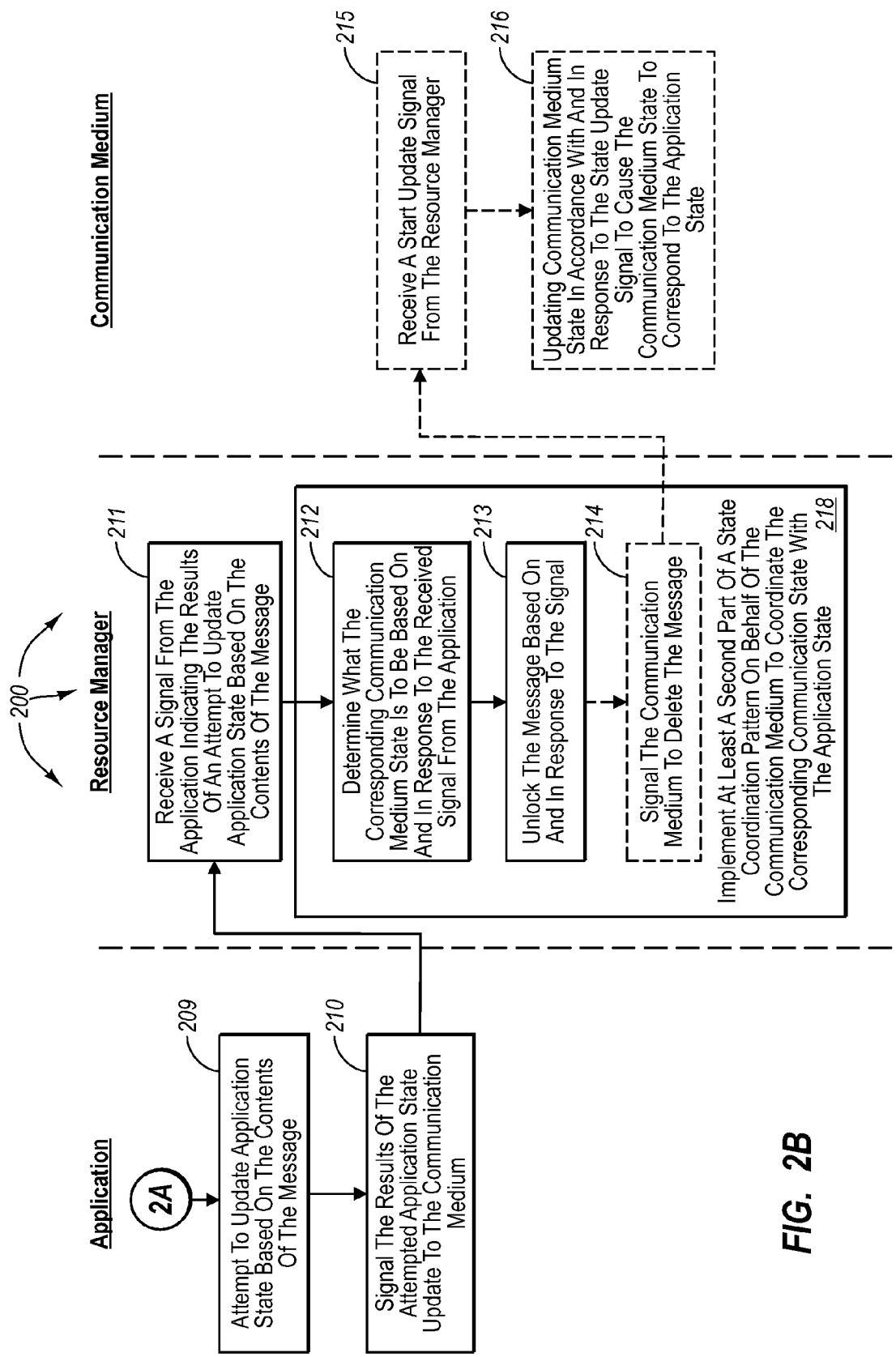

FIG. 2 illustrates a flow chart of an example method 200 for using a volatile network intermediary to coordinate resources. Method 200 will be described with respect to the components and data in computer architecture 100.

Method 200 includes an act of receiving one or more message (act 201). For example, communication medium 101 can receive messages 111, 112, and 113.

Method 200 includes an act of requesting a message from a communication medium (act 202). For example, consumer 103A can send request 141 to resource coordinator 106. Request 141 can be a request for a message from communication medium 101. Method 200 includes an act of receiving a request for a message from an application (act 203). For example, resource manger 106 can receive request 141 from consumer 103A.

Method 200 includes an act of accessing a message list of one or more messages of the communication medium to identify an available message (act 204). For example, resource coordinator 106 can access message list 107 to identify that message 113 is available on communication medium 101 (i.e., message 113 is not present in lock table 109). To build message list 107, resource coordinator 106 can enumerate 142 the messages of communication medium 101. Resource coordinator 106 can then enumerate message IDs in message list 107 until it identifies that message 113 is available.

Resource coordinator 106 can also utilize enumeration caching. That is, resource coordinator 106 can maintain an updated message list 107. Thus, when a request for a message is received, resource coordinator 106 may already know the identifier of next available message from updated message list 107 without performing further enumeration (e.g., from previous enumerations)

Resource coordinator 106 can also utilize event driven enumeration (e.g., instead of or in combination with express enumeration). For example, resource coordinator 106 can subscribe to receiving updates about changes in the communication medium state 101. Resource coordinator 106 can construct message list 107 from received updates. In some embodiments, resource coordinator 106 uses event driven enumeration in combination with enumeration caching to maintain message list 107.

Method 200 includes an act of implementing at least part of a state coordination pattern to facilitate processing of the available message, the intermediary resource manager implementing the state coordination pattern on behalf of the communication medium to coordinate state between the application and the communication medium (act 217). For example, resource coordinator 106 can implement at least part of a state coordination pattern to facilitate processing message 113. Resource coordinator 106 can implement the at least part of the state coordination pattern to coordinate state on behalf of communication medium 101 to coordinate state between application 103 and communication medium 101. Resource coordinator 106 can implement virtually any state coordination pattern on behalf of communication medium 101, such as, for example, a state coordination pattern supported by application 103. Accordingly, resource coordinator 106 can implement different parts of the state coordination pattern as appropriate, to coordinate state between application 103 and communication medium 101.

In some embodiments, resource coordinator 106 implements a peek lock state coordination pattern to coordinate state between application 103 and communication medium 101. Accordingly, in these embodiments, act 217 includes appropriate acts for implementing at least part of the peek lock state coordination pattern.

In these embodiments, method 200 includes an act of accessing the contents of an available message (act 205). For example, resource coordinator 106 can scan message list 107 in combination with lock table 109 to identify that message 113 is not currently locked. In response, resource coordinator 106 can peek 143 at the contents of message 113.

In these embodiments, method 200 includes an act of locking the message (act 206). For example, resource manager can enter lock 144 into lock table 109. Lock 144 is a record that indicates that message 113 is locked for use by consumer 103A. Message 113 can be locked to prevent further access by other consumers of application 103, such as, for example, consumer 103B.

In these embodiments, method 200 includes an act of providing the accessed contents to the application (act 207). For example, resource coordinator 106 can provide content view 113A (the contents of message 113) to consumer 103A. Alternately, application 103 and communication medium 101 can coordinate transfer of content view 113A without relaying through resource coordinator 106.

Method 200 includes an act of receiving the contents of a message (act 208). For example, consumer 103A can receive content view 113A. Method 200 includes an act of attempting to update application state based on the contents of the message (act 209). For example, application 103 can attempt to update its state based on content view 113A (i.e., the contents of message 113).

Method 200 includes an act of signaling the results of the attempted application state update to the communication medium (act 210). For example, consumer 103A can send signal 146 to resource coordinator 106. Signal 146 can indicate that application state was or was not successfully updated based on content view 113A. Method 200 includes an act of receiving a signal from the application indicating the results of an attempt to update application state based on the contents of the message (act 211). For example, resource coordinator 106 can receive signal 146 from consumer 103A indicating results of an attempt to update state for application 103 based on content view 113A.

Method 200 includes an act of implementing at least a second part of the state coordination pattern on behalf of the communication medium to coordinate the corresponding communication medium state with the application state (act 218). For example, resource coordinator 106 can implement at least a second part of the state coordination pattern on behalf of communication medium 101 to coordinate the corresponding state of communication medium 101 with the state of application 103.

In these embodiments, method 200 includes an act of determining what the corresponding communication medium state is to be based on and in response to the received signal from the application (act 212). For example, resource coordinator 106 can determine what the state of communication medium 101 is to be based on and in response to signal 146. When signal 146 indicates that application state for application 103 was successfully updated, resource manager can determine that message 113 is to be deleted from communication medium 101. On the other hand, when signal 146 indicates that application state for application 103 was not successfully updated, resource manager can determine that message 113 is to be retained at communication medium 101. Other state changes altering the properties of message 113 are also possible.

In embodiments implementing a peek lock state coordination pattern, method 200 includes an act of unlocking the message based on and in response to the signal (act 213). For example, resource coordinator 106 can remove the record for message 113 from lock table 109. The record can be removed in response to either of a successful or unsuccessful state update at application 103. When an unsuccessful state update occurs, message 113 is retained at communication medium 101 for subsequent processing (e.g., another attempt to process message 113 and update state at application 103).

Method 200 can then include an act of signaling a corresponding appropriate state update to the communication medium (act 214). For example, resource coordinator 106 can send a state update signal to communication medium 101 to update the state of message 113. Method 200 can include an act of receiving a state update signal to from the resource manager (act 215). For example, communication medium 101 can receive the state update signal from resource coordinator 106 to update the state of message 113. When signal 146 indicates a successful state update for application 103 (and thus message 113 is no longer needed), resource coordinator 106 can send a state update signal to communication medium 101 to delete message 113. However, other state changes altering the properties of message 113 are also possible.

Method 200 includes an act of updating communication medium state in accordance with and in response to the state update signal to cause the communication medium state to correspond to the application state (act 216). For example, communication medium 101 can update its state to correspond to the state of application 103. When signal 146 indicates a successful state update for application 103 (and thus message 113 is no longer needed), communication medium 101 can delete message 113. As a result, the state change deleting the message from communication medium 101 corresponds to the state change from successfully processing message 113.

However, if the current communication medium state is already appropriate, intermediary resource coordinator 106 may not send a state update signal to the communication medium. For example, when a message is not processed successfully, corresponding communication medium state for communication medium 101 can remain the same. Thus, there is little, if any, need for resource coordinator 106 to signal a state update to communication medium 101.

The arrangement of acts in method 200 is merely one example embodiment of present invention. Embodiments that omit and/or combine acts of method 200 and/or that perform acts of method 200 in different orders are included within the scope of present invention.

Accordingly embodiments of present invention provide a mechanism for an network intermediary to facilitate a state coordination pattern, such as, for example, a peek lock state coordination pattern, for a communication medium that does not support the state coordination pattern. In some embodiments, receiving applications can make use of this network intermediary solely by changing the receive location. However, the receiving application may not be able to distinguish the network intermediary from a native implementation of the state coordination pattern. Further, the network intermediary does not require deployment of a persistent or durable store to coordinate state between receiving applications and the original communication medium.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture including a communication medium, an intermediary resource manager, and an application with a plurality of consumers that consume messages from the communication medium, the intermediary resource manager situated between the application and the communication medium, the application supporting a state coordination pattern to coordinate state transitions between the application and accessible communication mediums, wherein the communication medium does not support the state coordination pattern of the application, a method for coordinating state between the communication medium and the application based on the state coordination pattern, notwithstanding that the communication medium does not support the state coordination pattern, the method comprising:

receiving a message request from a consumer in the plurality of consumers, wherein the message request is requesting a message from the communication medium through the intermediary resource manager, for processing;

the intermediary resource manager identifying an available message available at the communication medium;

an act of the intermediary resource manager implementing at least part of the state coordination pattern to facilitate processing of the available message, wherein the intermediary resource manager including a message list which is a temporary queue listing enumerated message IDs for messages, wherein the intermediary resource manager including a consumer list which is a temporary queue listing competing consumers for messages, wherein the intermediary resource manager including a lock table comprising corresponding message IDs and consumer IDs, and wherein the intermediary resource manager enumerates the message list to find a message that is not present in the lock table;

the intermediary resource manager implementing the state coordination pattern on behalf of the communication medium to coordinate state between the application and the communication medium, the intermediary resource manager appearing to the consumer as the communication medium, wherein the intermediary resource manager provides an implementation of the state coordination pattern for the application and manipulates the state of the communication medium which does not support the state coordination pattern of the application such that the states of the application and the communication medium are coordinated as if the communication medium supported the state coordination pattern directly despite that the communication medium does not support the state coordination pattern;

the intermediary resource manager receiving a signal from the requesting consumer indicating the results of an attempt to update application state based on the contents of the available message;

an act of determining what the corresponding communication medium state is to be based on and in response to the received signal indicating the results of attempting to update the application state; and an act of the intermediary resource manager implementing at least a second part of the state coordination pattern on behalf of the communication medium to coordinate the corresponding communication medium state with the application state.

2. The method as recited in claim 1, further comprising:
an act of the resource manager enumerating the one or more messages of the communication medium prior to identifying an available message.

3. The method as recited in claim 1, wherein identifying an available message comprises identifying the first available message on the communication medium that is not locked.

4. The method as recited in claim 1, wherein the act of the intermediary resource manager implementing at least part of the state coordination pattern to facilitate processing of the available message comprises:
an act of the resource manager accessing the contents of the available message;
an act of the resource manager locking the message to prevent further access to the contents of the message during the time the requesting consumer is processing the accessed message contents; and
an act of the resource manager providing the accessed contents to the application.

5. The method as recited in claim 4, wherein the act of the resource manager locking the message comprises an act of inserting a record into the lock table, the record including a message ID of the available message and a consumer ID of the requesting consumer, the record indicating that the message is locked for processing by the requesting consumer.

6. The method as recited in claim 1, wherein the act of the intermediary resource manager implementing at least part of the state coordination pattern to facilitate processing of the available message comprises an act of the intermediary resource manager implementing at least part of a peek lock state coordination pattern to facilitate processing of the available message.

7. The method as recited in claim 6, wherein the act of the intermediary resource manager implementing at least a second part the state coordination pattern on behalf of the communication medium to coordinate the corresponding communication medium state with the application state comprises an act of the intermediary resource manager implementing at least a second part of the peek lock state coordination pattern.

8. The method as recited in claim 1, wherein receiving a signal from the requesting consumer comprises receiving a signal that indicates the available message was successfully processed.

9. The method as recited in claim 8, wherein the act of determining what the corresponding communication medium state is to be comprises an act of determining that the available message is to be deleted from the communication medium.

10. The method as recited in claim 1, wherein receiving a signal from the requesting consumer comprises receiving a signal that indicates the available message was not successfully processed.

11. The method as recited in claim 10, wherein the act of determining what the corresponding communication medium state is to be comprises an act of determining that the available message is to remain at the communication medium.

12. The method as recited in claim 1, wherein the act of the intermediary resource manager implementing at least a second part the state coordination pattern on behalf of the communication medium to coordinate the corresponding communication medium state with the application state comprises an act of the intermediary resource manager unlocking the message.

13. The method as recited in claim 1, wherein the act of the intermediary resource manager implementing at least a second part the state coordination pattern on behalf of the communication medium to coordinate the corresponding communication medium state with the application state comprises an act of the intermediary resource manager signaling a corresponding appropriate state update to the communication medium.

14. The method as recited in claim 13, wherein the act of the intermediary resource manager signaling a corresponding appropriate state update to the communication medium comprises an act of signaling the communication medium to delete the available message.

15. The method as recited in claim 13, wherein the act of intermediary resource manager signaling a corresponding appropriate state update to the communication medium comprises an act of the intermediary resource manager participating in a transaction that atomically coordinates: an appropriate state update to the communication medium, removal of a record for the available message from a lock table, the lock table, and at least one operation for the application.

16. A computer program product for use in a computer architecture including a communication medium, a resource manager, and an application with a plurality of consumers that consume messages from the communication medium, the computer program product for implementing a method for coordinating state between the communication medium and the application, wherein the communication medium does not support a state coordination pattern of the application, the computer program product comprising one or more computer readable physical storage media having stored thereon computer-executable instructions that, when executed at a processor, cause the computer architecture to perform the method, including the following:
receive a message request from a consumer in the plurality of consumers, wherein the message request is requesting a message from the communication medium the resource manager, for processing;
the resource manager accessing the message list of one or more messages of the communication medium to identify an available message;
access the contents of the available message;
lock the available message to prevent further access to the contents of the available message;
the resource manager providing the accessed message contents to the requesting consumer, wherein the resource manager appears to the consumer as the communication medium, wherein the resource manager including a message list which is a temporary queue listing enumerated message IDs for messages, wherein the resource manager including a consumer list which is a temporary queue listing competing consumers for messages, wherein the resource manager including a lock table comprising corresponding message IDs and consumer IDs, and wherein the resource manager enumerates the message list to find a message that is not present in the lock table;

wherein the resource manager provides an implementation of the state coordination pattern for the application and manipulates a state of the communication medium which does not support the state coordination pattern of the application such that the states of the application and the communication medium are coordinated as if the communication medium supported the state coordination pattern directly despite that the communication medium does not support the state coordination pattern;

receive a signal from the requesting consumer indicating the results of an attempt to update application state based on the contents of the message; and at least unlock the available message in response to the received signal.

17. The method as recited in claim 16, wherein computer-executable instructions that when executed cause the computer architecture to identify an available message comprise computer-executable instructions that when executed cause the computer architecture to identify the first available message on the communication medium that is not locked.

18. The method as recited in claim 16, wherein computer-executable instructions that when executed cause the computer architecture to lock the available message to prevent further access to the contents of the available message comprise computer-executable instructions that when executed cause the computer architecture to insert a record into the lock table, the record including a message ID of the available message and a consumer ID of the requesting consumer, the record indicating that the message is locked for processing by the requesting consumer.

19. The method as recited in claim 16, wherein computer-executable instructions that when executed cause the computer architecture to at least unlock the available message in response to the received signal comprise computer-executable instructions that when executed cause the computer architecture to:

unlock the available message in response to the received signal from the application; and signal the communication medium to delete the available message.

20. A computer system, the computer system including:
one or more processors;
system memory;
one or more computer storage media have stored thereon computer-executable instructions representing a communication medium, an application, and
an intermediary resource manager situated between the communication medium and the application, wherein the communication medium is configured to:
receive messages;
receive signals to delete messages from the intermediary resource manager; and
delete messages based on and in response to delete signals; wherein the application includes a plurality of consumers that consume messages from the communication medium, each consumer configured to:
request messages from the communication medium;
receive the contents of messages;
attempt to update application state based on the contents of messages; and
signal results of attempted application state updates to the communication medium; and
wherein the intermediary resource manager is configured to appear to the plurality of consumers as the communication medium, wherein the intermediary resource manager including a message list which is a temporary queue listing enumerated message IDs for messages, wherein the intermediary resource manager including a consumer list which is a temporary queue listing competing consumers for messages, wherein the intermediary resource manager including a lock table comprising corresponding message IDs and consumer IDs, and wherein the intermediary resource manager enumerates the message list to find a message that is not present in the lock table;

the intermediary resource manager providing an implementation of a state coordination pattern for the application and manipulating a state of the communication medium which does not support the state coordination pattern of the application such that states of the application and the communication medium are coordinated as if the communication medium supported the state coordination pattern directly despite that the communication medium does not support the state coordination pattern, the intermediary resource manager also configured to:

receive requests for messages from each consumer in the plurality of consumers;

access a message list of one or more messages of the communication medium to identify available messages;

access the contents of available messages;

lock messages to prevent further access to the contents of the messages;

provide accessed message contents to consumers;

receive signals from consumers indicating the results of an attempt to update application state based on the contents of the message;

unlock messages; and signal the communication medium to delete messages.

* * * * *